United States Patent [19]
Maruyama et al.

[11] Patent Number: 5,686,725
[45] Date of Patent: Nov. 11, 1997

[54] METHOD FOR READING OF INVISIBLE MARKING

[75] Inventors: Tsutomu Maruyama, Hiratsuka; Atsushi Akiyama, Chigasaki; Hiroyasu Matsuki, Hiratsuka; Kazuo Sanada; Sadao Chigira, both of Chiba; Masanobu Hidaka, Tokyo, all of Japan

[73] Assignees: Kansai Paint Co., Ltd., Hyogo-ken; Fujikura Ltd., Tokyo; Matsuo Sangyo Co., Ltd., Osaka-fu, all of Japan

[21] Appl. No.: 466,995

[22] Filed: Jun. 6, 1995

[30] Foreign Application Priority Data

Aug. 10, 1994 [JP] Japan ..................... 6-208227

[51] Int. Cl.[6] ............................................. G06K 7/10
[52] U.S. Cl. .............................. 250/271; 250/341.8
[58] Field of Search ........................... 250/271, 341.8

[56] References Cited

U.S. PATENT DOCUMENTS

| | | |
|---|---|---|
| 3,566,120 | 2/1971 | Lane, Jr. ................... 250/271 |
| 5,350,448 | 9/1994 | Dietz et al. ............... 106/441 |

*Primary Examiner*—Constantine Hannaher
*Attorney, Agent, or Firm*—Wenderoth, Lind & Ponack

[57] ABSTRACT

A method for reading of information, which comprises printing information on a metal substrate or a substrate capable of transmitting infrared rays of 2–10 μm wavelength, with a marking ink containing tin oxide, indium-tin mixed oxide or a mixture of tin oxide or indium-tin mixed oxide and at least one compound selected from the group consisting of alumina, barium sulfate, silicon dioxide and calcium carbonate, as necessary coating a clear coating or a coloring ink on at least the information-printed area of the substrate, and identifying the information by the use of a CCD camera sensitive to infrared rays of 2–10 μm wavelength or an infrared detector. No noise is generated even when the reflectance of a light from the substrate surface is large, and the information can be identified (read) easily.

15 Claims, 3 Drawing Sheets

FIG. 1
Invisible marking and clear coating on Al substrate
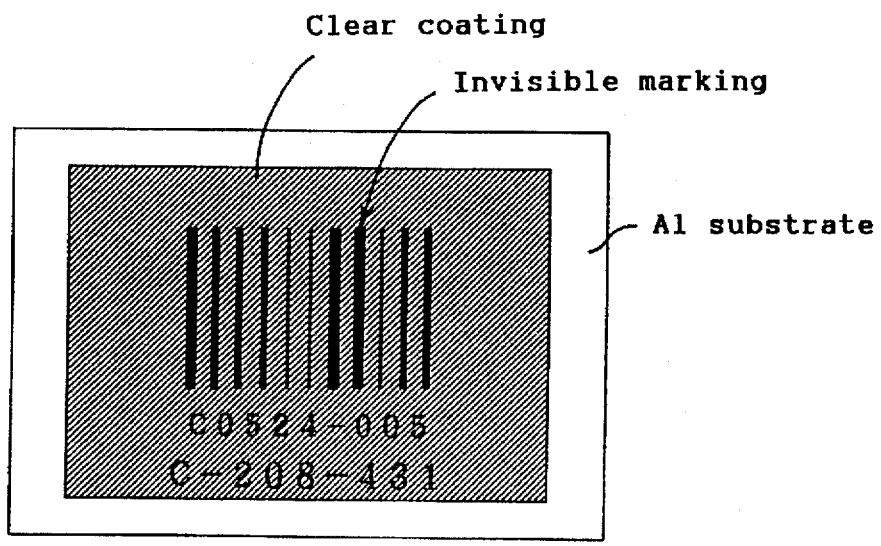
FIG. 3A
Constitution of reader using infrared camera
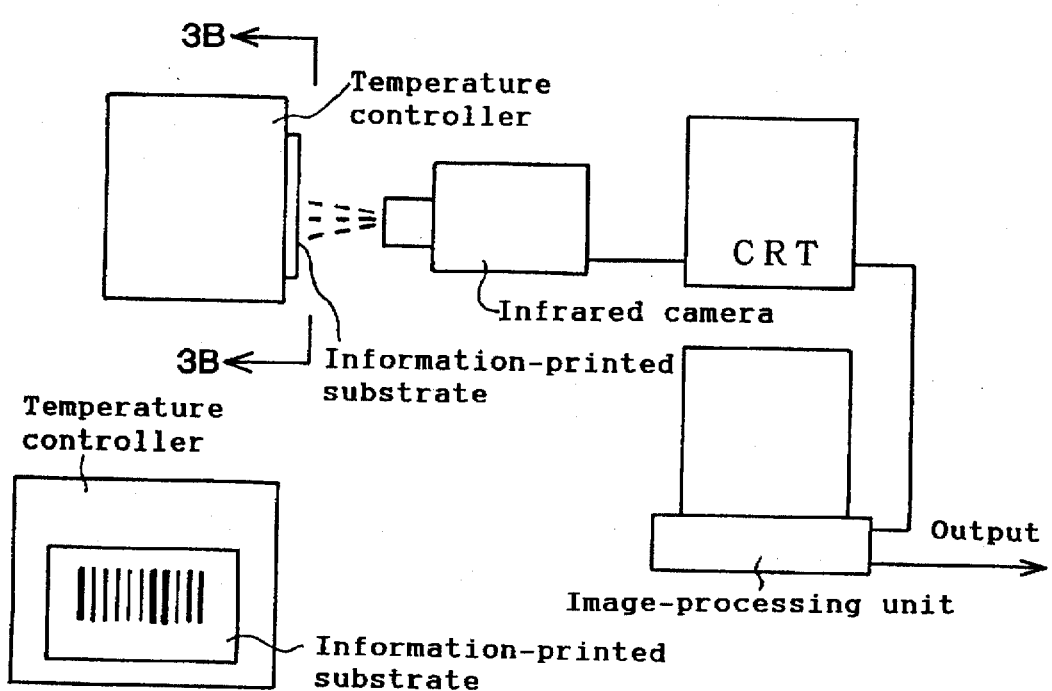
FIG. 3B Constitution of reader using infrared detector

METHOD FOR READING OF INVISIBLE MARKING

The present invention relates to a method for reading of invisible marking, which comprises printing information (invisible marking) such as bar code, marking, lot No. and the like on a substrate with a particular ink (a marking agent) invisible to naked eyes or difficult to see with naked eyes when coated and measuring a difference between the amounts of infrared rays emitted from the information-printed area and other area of the substrate, by the use of a CCD camera sensitive to infrared rays or an infrared detector to identify the information.

Bar code is an information medium for merchandise management, consisting of white bar(s) and black bar(s), and is in wide use to manage the kinds, prices, sales volumes and amounts, stock levels, etc. of merchandises by reading the bar code using an optical device. Bar code is expected to find even wider applications in the future. Bar code has hitherto been printed in two colors (i.e. white and black) so as to be seen with naked eyes, which is undesirable from the standpoint of merchandise designing and makes impossible the bar code application to merchandise portions which are liable to be stained. Incidentally, bar code itself has no meaning to general consumers and is used solely for merchandise management.

Hence, there was proposed a special bar code (a so-called stealth bar code) which is invisible to naked eyes and whose information can be identified by the application of infrared rays. It was proposed, for example, to print a bar code on a substrate with indium-tin oxide (which is an infrared-absorbing compound) and identify the printed area by the use of an infrared applicator. In this approach, however, the infrared applicator is large; moreover, the uniform reflected light from the printed substrate surface generates a noise, which hinders the identification.

The main object of the present invention is to develop a method for reading of invisible marking, which is free from the above problems and which can print, on a substrate, information substantially or completely invisible to naked eyes and enables easy identification of the printed information (an invisible marking) with a compact device without generation of noise even when the reflectance of a light from the substrate surface is large.

The present inventors have found out that the above object can be achieved by printing information (e.g. bar code, marking or lot No.) on a substrate with a marking ink containing, as the infrared-absorbing component, tin oxide, indium-tin mixed oxide, or a mixture of tin oxide or indium-tin mixed oxide and at least one compound selected from the group consisting of alumina, barium sulfate, silicon dioxide and calcium carbonate, and identifying the printed information by the use of a CCD camera sensitive to infrared rays of 2–10 µm wavelength or an infrared detector.

According to the present invention there is provided a method for reading of information, which comprises printing information on a metal substrate or a substrate capable of transmitting infrared rays of 2–10 µm wavelength, with a marking ink containing tin oxide, indium-tin mixed oxide, or a mixture of tin oxide or indium-tin mixed oxide and at least one compound selected from the group consisting of alumina, barium sulfate, silicon dioxide and calcium carbonate, as necessary coating a clear coating or a coloring ink on at least the information-printed area of the substrate, and identifying the information by the use of a CCD camera sensitive to infrared rays of 2–10 µm wavelength or an infrared detector.

The reading and identification of information according to the present invention is conducted by measuring the amounts of infrared rays emitted from the information (marking ink)-printed area and other area of the substrate and detecting the difference between the two emissivities.

The present invention is hereinafter described in detail.

The marking ink used in the present invention is an marking agent used for printing information such as bar code or the like on the surface of a substrate. When coated on a substrate, the ink shows, as its feature, a large absorptivity for infrared rays of 2–10 µm wavelength, preferably 3–5 µm wavelength at temperatures lower than 30° C. As a result, it was found that the information printed on a metal substrate or a substrate capable of transmitting infrared rays of 2–10 µm wavelength, with said marking ink can easily be identified by detecting the infrared rays emitted from the information-printed area of the substrate by the use of a simple device such as CCD camera sensitive to infrared rays, infrared detector o r the like.

The marking ink can be prepared by using, as the main component, any of tin oxide, indium-tin mixed oxide and a mixture of tin oxide or indium-tin mixed oxide and at least one compound selected from alumina, barium sulfate, silicon dioxide and calcium carbonate (this main component is hereinafter referred to as "marking component") and, as necessary, adding thereto a coating resin (a vehicle), a solvent or dispersing agent (e.g. an organic solvent or water), an extender pigment, etc.

Tin oxide includes a compound represented by SnO or $SnO_2$. Indium-tin mixed oxide (hereinafter referred to as "ITO") is a mixture of indium oxide ($In_2O_3$) and the above tin oxide. ITO, when irradiated with infrared rays of 2–10 µm wavelength, gives a substantially fixed reflectance regardless of the wavelength of the 2–10 µm infrared rays applied. In ITO, the proportions of indium oxide and tin oxide are not particularly restricted; however, the preferable proportion of indium oxide is 1–95%, particularly 40–90%, more particularly 50–80%, and the preferable proportion of tin oxide is 99–5%, particularly 60–10%, more particularly 50–20%, all based on the total weight of the two components.

The mixture of tin oxide or ITO and at least one compound selected from alumina ($Al_2O_3$), barium sulfate ($BaSO_4$), silicon dioxide ($SiO_2$) and calcium carbonate ($CaCO_3$), is preferred to tin oxide or ITO alone because, when coated, it is substantially or completely invisible to naked eyes. The preferable components proportions of said mixture are such that the proportion of at least one compound selected from alumina, barium sulfate, silicon dioxide and calcium carbonate is 5–400 parts by weight, particularly 10–200 parts by weight, more particularly 10–150 parts by weight per 100 parts by weight of tin oxide or ITO.

The coating resin is used as a vehicle in order to uniformly disperse the marking component in the marking ink and satisfactorily form a film of the marking ink, and has no particular restriction as to the composition. It may be a resin ordinarily used in inks and coatings. Specific examples thereof are a polyester resin, an alkyd resin, an epoxy resin, a vinyl resin, a fluororesin, a urethane resin, a polyamide resin, a polyimide resin, a polysiloxane and an acrylic resin. They may each be any of thermoplastic type, room temperature crosslinking type, and thermosetting type. In order to crosslink and cure the coating resin, it is possible to use as necessary, in combination with the resin, a crosslinking agent such as melamine resin, urea resin, polyisocyanate compound, polycarboxylic acid or anhydride thereof, epoxy compound or the like.

The content of the marking component in the marking ink is not strictly restricted, but is generally 10–1,000 parts by weight, particularly 50–800 parts by weight, more particularly 150–700 parts by weight per 100 parts by weight (as solid) of the coating resin.

The marking ink contains the marking component and the coating resin as the essential components, and these components may as necessary be dissolved or dispersed in an organic solvent and/or water for better marking operation. The organic solvent may be any organic solvent as long as it can dissolve or disperse the marking component of powder form and the coating resin, and includes, for example, at least one compound selected from aliphatic or aromatic hydrocarbons, alcohols, esters, ketones, etc. When use of an aqueous marking ink is desired, deionized water, tap water or the like can be used as the solvent or dispersing agent.

In the present invention, the substrate to which the marking ink is to be applied, may be a metal substrate or a substrate capable of transmitting infrared rays of 2–10 µm wavelength. The metal substrate includes, for example, those made of aluminum, tinplate, iron, stainless steel, copper and alloys thereof. These substrates may beforehand be coated with a primer or the like. As the metal substrate, there may also be used said metal-metallized papers or plastics and said-metal-plastic film laminates. In the case of metallized papers or plastics, the marking ink can be coated on either of the metallized side and the non-metallized side. In the case of the laminates, the marking ink can be coated on either of the film side and the metal side.

The substrate capable of transmitting infrared rays of 2–10 µm wavelength includes, for example, films or sheets made of a plastic, a paper, a wood, a cloth or the like.

The substrate has no particular restriction as to the shape and may have any desired shape such as cylinder, box, bag, sheet, plate, sphere or the like. Before being coated with the marking ink, the substrate may be subjected to a surface treatment such as chemical treatment or the like in order to improve, for example, the ink adhesivity to the substrate.

The marking (printing) on the substrate surface can be conducted, for example, by gravure printing, silk screen printing, offset printing, ink jet method or the like. The preferable thickness of the marking film formed is 0.5–10 µm, particularly 1–5 µm in terms of dry film thickness. The marking film can be cured by room temperature standing, heating or irradiation with ultra violet rays or electron beam, depending upon the kind of the vehicle component used.

The form of marking is not particularly restricted and includes, for example, letters, numerals, markings and patterns. It specifically is bar codes, production dates, lot numbers, producer markings, etc.

On at least the marking area and its vicinity of the substrate surface after marking may further be coated a clear coating or a coloring ink as necessary. This is preferable because the marking can be protected and hidden thereby.

The marking ink containing, in particular, tin oxide or ITO, when coated on a substrate, is visible to naked eyes in some cases. In such cases, it is preferable for better appearance to cover and hide the coated marking ink with a coloring ink.

The clear coating is a coating used for forming a clear film, and contains a coating resin as the main component and, as necessary, a solvent or dispersing agent (e.g. an organic solvent or water), etc. The coating resin is preferably the same as mentioned with respect to the marking ink and may as necessary be used in combination with a crosslinking agent. The coloring ink used for hiding the marking ink layer is preferably a mixture of said clear coating and a coloring material (e.g. a coloring pigment or dye).

The coating of the clear coating or the coloring ink can be conducted, for example, by gravure printing, slik screen printing, offset printing, ink jet method or the like. The preferable thickness of the clear coating film or the coloring ink film formed is generally 1–20 µm, particularly 2–10 µm in terms of cured film thickness. The film can be cured by room temperature standing, heating or irradiation with ultra violet rays or electron beam, depending upon the kind of the vehicle component used.

Between the marking ink-printed area and other area of the substrate, there is a big difference in the amount of infrared rays of 2–10 µm wavelength, preferably 3–5 µm wavelength emitted therefrom.

The reading of information printed on a substrate, according to the present invention can be conducted by the use of a CCD camera sensitive to infrared rays of 2–10 µm wavelength or an infrared detector. By detecting the infrared rays emitted from the information-printed area and other area, the printed area and other area can be distinguished from each other. Thus, this reading requires no light source for infrared rays.

The detection of infrared rays emitted from the information-printed substrate can be made by the use of, for example, an infrared detector or a CCD camera sensitive to infrared rays. By measuring a difference between the amounts of infrared rays emitted from the marking ink-printed area and other area of the substrate, the information printed on the substrate can be identified and read.

The method for reading of invisible marking according to the present invention is described specifically with reference to the embodiments shown in FIG. 1 to FIG. 4.

FIG. 1 is a drawing showing a substrate sample obtained by forming an invisible marking of bar code form on an aluminum substrate and then coating a clear coating thereon.

FIGS. 3A and 3B together are a schematic drawing showing an example of the reader for invisible marking, using an infrared camera.

Figures 4A, 4B:
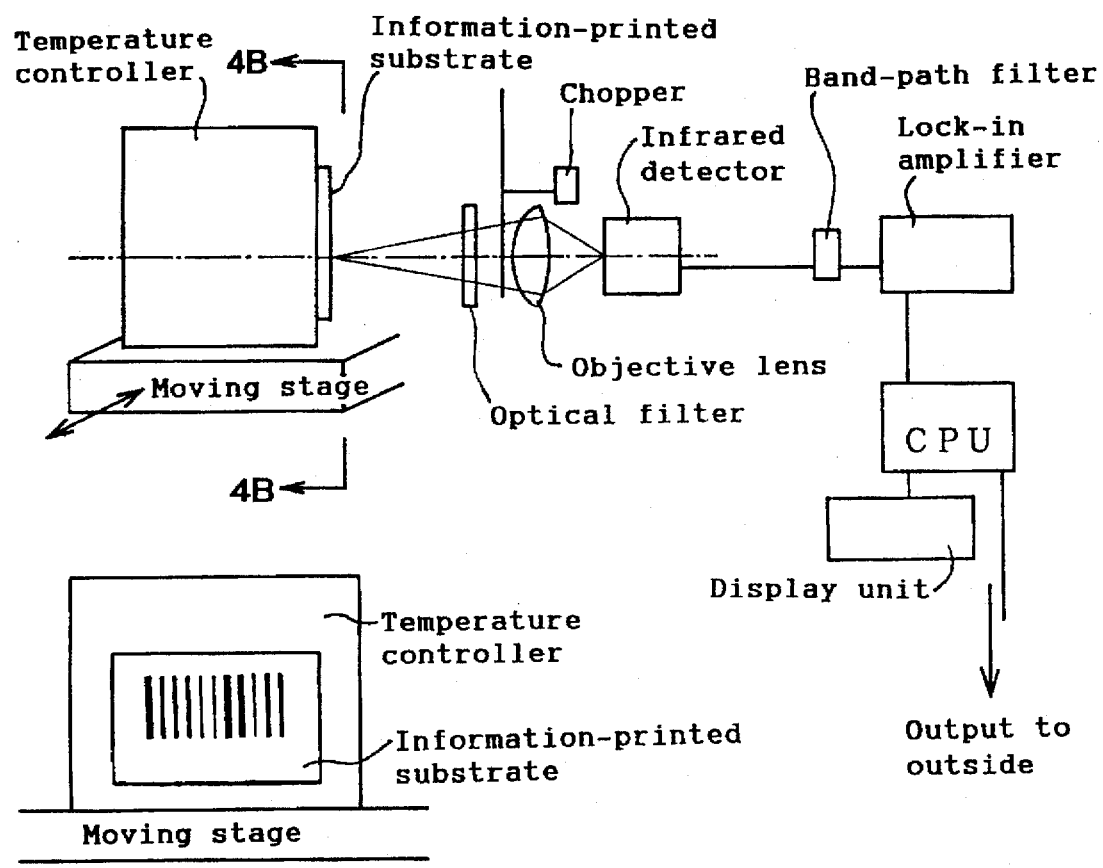

FIGS. 4A and 4B together are a schematic drawing showing an example of the reader for bar code, using an infrared detector.

The energy of heat radiation emitted from an object at a certain temperature is the largest in the case of a black body. Any object has the following relation between the spectral luminance $L_{\lambda, T}$ and the emissivity $\epsilon$ ($0<\epsilon<1$) at a temperature T:

$$L_{\lambda, T} = \epsilon L (\lambda, T) \tag{1}$$

wherein $L (\lambda, T)$ is the spectral luminance of a black body at a temperature T. The emissivity $\epsilon$ is equal to the absorptivity of the object, and the following relation holds between $\epsilon$, $\rho$ (the reflectance of the object) and $\tau$ (the transmissivity of the object):

$$\epsilon + \rho + \tau = 1 \tag{2}$$

As is appreciated from formula (1), two objects having different emissivities at a certain temperature give different spectral luminances, whereby the two objects can be distinguished.

Figure 2:
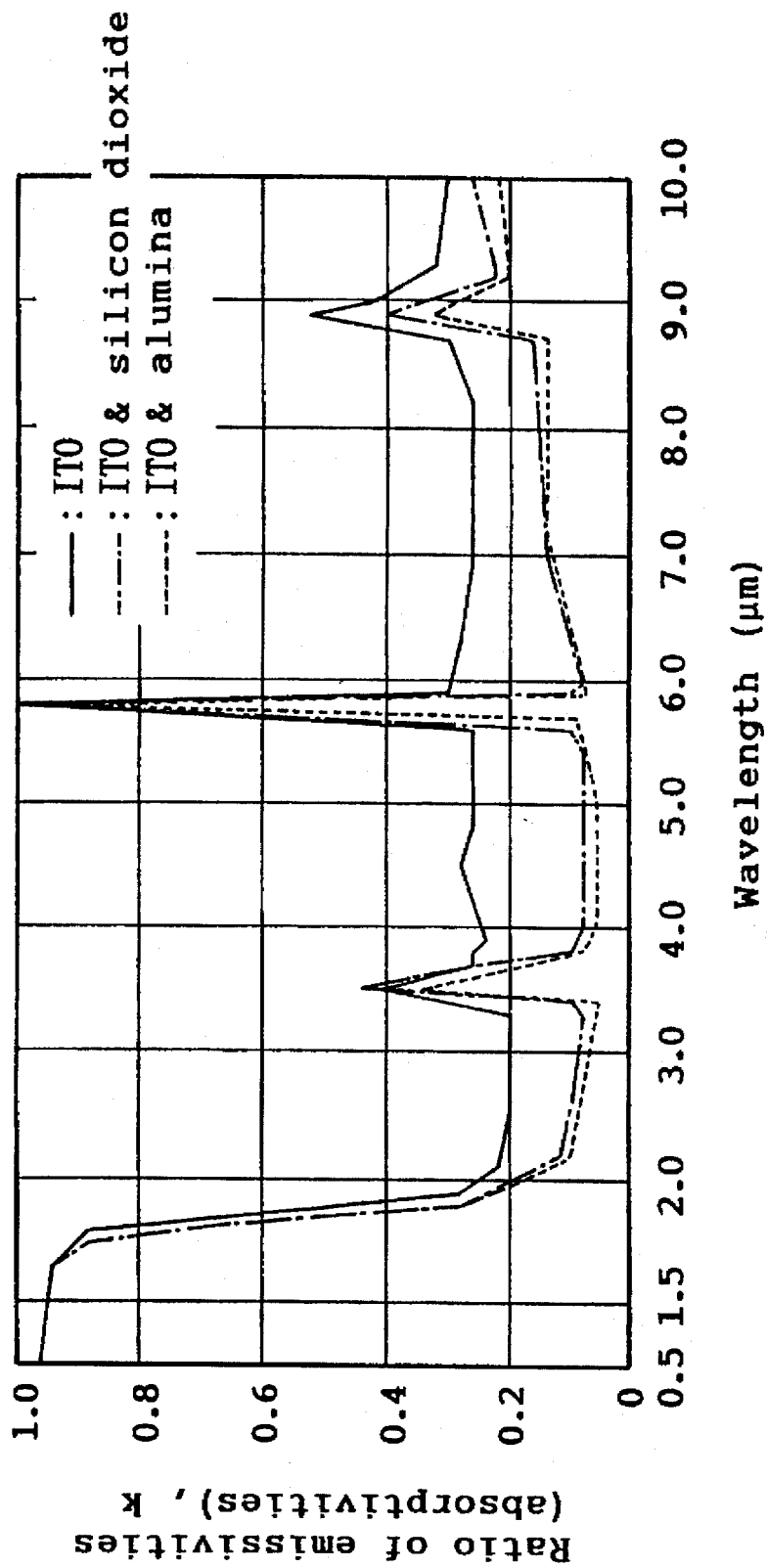
FIG. 2 is a graph showing the change of the ratio of emissivities of the invisible marking area and other area of the substrate sample shown in FIG. 1, in the infrared wavelength range of 2–10 µm.

For example, a bar code invisible marking is formed on an aluminum substrate with an invisible ink used in the present invention and then a clear coating is coated thereon to prepare a sample (FIG. 1). As shown in FIG. 2, the ratio (k)

of emissivities (absorptivities) of the invisible marking area and other area, represented by the following formula (3) is large in the infrared wavelength range of 2–10 μm; therefore, the invisible marking area and other area can be distinguished from each other.

$$k=(1-\epsilon M)/(1-\epsilon R) \quad (3)$$

wherein εM is the emissivity of invisible marking area and εR is the emissivity of other area. The emissivity of an object changes with its temperature change and, in the above printed aluminum substrate, the difference in emissivity between the invisible marking area and other area is larger as the temperature of the printed aluminum substrate gets higher than room temperature. Accordingly, by increasing the temperature of said substrate, the two areas can be distinguished at a high S/N ratio.

The FIG. 3A reader for invisible marking, using an infrared camera comprises a temperature controller for keeping an invisible marking-printed substrate at a fixed temperature between 25° C. and 120° C.; an infrared camera sensitive to an infrared wavelength range of 3–5 μm; a CRT for monitoring the video out from said camera; and an image-processing unit for reading the marking (e.g. bar code or letters) formed with an invisible ink. The results of reading by the image-processing unit are outputted to a monitor, a printer, a computer or the like.

The FIG. 4A reader for bar code, using an infrared detector comprises the same temperature controller as in FIG. 3A, for heating an invisible marking-printed substrate; an optical filter for cutting off the light wavelength range unnecessary for measurement; a chopper for modulating an incident light; an objective for projecting the marking (printed on the substrate) on an infrared detector; an infrared detector; a band-path filter; a lock-in amplifier; a central processing unit (a CPU) for reading and processing the inputted data of the marking; a display unit for displaying the processed data; and an output terminal of the data. As the infrared detector, there can be used PBSe or PBS each capable of detecting infrared rays of 2–3 μm wavelength range at normal temperature.

The present invention is hereinafter described more specifically by way of Examples. In the Examples, parts and % are by weight.

EXAMPLE 1

There were mixed 320 parts of an indium-tin mixed oxide (ITO) (a product of Fuji Titanium Industry Co., Ltd.; average particle diameter=0.03 μm), 100 parts of an alumina powder [#1000 White Alundum (trade name) produced by Showa Denko K. K.], 300 parts of a polyester resin (a solution having a solid content of 50%), 200 parts of butyl acetate and 150 parts of toluene. The mixture was dispersed by the use of a paint conditioner to obtain a marking ink (1).

The ink (1) was coated on an aluminum plate (thickness= 0.3 mm) by the use of a gravure coater to form a bar code pattern in a film thickness (a cured film thickness, the same applies hereinafter) of 3 μm, followed by drying at 100° C. On at least the bar code pattern was coated an aqueous clear coating of acrylic resin type in a film thickness of 3 μm, followed by drying at 150° C. for 60 seconds.

Identification of bar code was conducted at the printed side of the printed substrate at room temperature (20° C.) by the use of a CCD camera sensitive to infrared rays. Identification of bar code was good.

Separately, an ink [which was the marking ink (1) minus ITO] was printed in the same manner, and identification of bar code was conducted using the same CCD camera. Identification of bar code was impossible.

EXAMPLE 2

There were mixed 300 parts of ITO, 400 parts of barium sulfate, 300 parts of an acrylic resin emulsion (solid content=40%) and 500 parts of tap water, and the mixture was dispersed by the use of a sand mill to obtain a marking ink (2).

The ink (2) was coated on an aluminum-metallized paper (thickness=0.3 μm) to form a bar code pattern in a film thickness of 5 μm, followed by drying at 100° C. On at least the bar code-printed area was coated a clear coating consisting of an acrylonitrile-butadiene emulsion, in a film thickness of 6 μm by the use of a gravure coater, followed by drying.

The film of the ink (2) was transparent; the adhesion between the film and the aluminum-metallized paper was good; and visual distinction between the printed area and other area was difficult. Observation was made at the printed side of the printed paper at 20° C. by the use of a marking reader using a CCD camera sensitive to infrared rays, shown in FIGS. 3A and 3B. Identification of bar code on monitor based on the infrared absorption by bar code was good.

EXAMPLE 3

There were mixed 600 parts of ITO, 140 parts of silicon dioxide, 400 parts of a polysiloxane resin (solid content= 40%), 200 parts of isopropyl alcohol and 500 parts of isobutyl acetate. The mixture was dispersed by the use of a sand mill to obtain a marking ink (3).

The marking ink (3) was diluted with methyl ethyl ketone and then coated on a tinplate sheet (thickness=0.3 mm) by ink jet printing to form a marking of "ABC" in a film thickness of 1 μm, followed by drying at 200° C.

The thus-formed marking was read at 25° C. in the same manner as in Example 1. As a result, the marking could be identified clearly, and the adhesion between the ink (3) film and the tinplate sheet was good. Moreover, the visual distinction of the marking area was impossible.

EXAMPLE 4

There were mixed 300 parts of ITO, 50 parts of calcium carbonate, 500 parts of an acrylic resin solution (solid content=30%), 200 parts of methyl ethyl ketone and 400 parts of butyl acetate. The mixture was dispersed by the use of a ball mill to obtain a marking ink (4).

The ink (4) was coated on a tinplate sheet (thickness=0.5 mm) by the use of a gravure coater to form a numeral of "123". On at least the numeral was coated the same aqueous clear coating as used in Example 1, in a film thickness of 10 μm, followed by drying.

The numeral printed on the tinplate sheet was read by the use of a CCD camera sensitive to infrared rays. As a result, the numeral could be identified clearly. Moreover, the adhesion between the ink (4) film and the tinplate sheet was good, and the visual distinction of the numeral area was impossible.

EXAMPLE 5

The ink (1) of Example 1 was coated on a PET (polyethylene terephthalate) film (thickness=12.5 μm) by the use of a gravure coater to form letters of "ALESCO" in a film thickness of 4 μm and then dried. On the letters-formed side of the PET film was coated an adhesive by the use of a gravure coater. The resulting material was subjected to solvent vaporization and then laminated with an aluminum plate (thickness=0.3 mm) at 180° C.

For the PET side of the resulting laminate was conducted the same test as in Example 2 by the use of a CCD camera sensitive to infrared rays. As a result, the printed area could be identified clearly. Moreover, the adhesion between the ink (1) film and the aluminum plate was good, and the visual distinction of the printed area was impossible.

EXAMPLE 6

An organic solvent type white coating was coated on an aluminum plate (thickness=0.8 mm) in a film thickness of 4 μm and dried at 140° C. Thereon was coated the marking ink (3) obtained in Example 3, to form a bar code pattern in a film thickness of 2 μm, and then dried. Identification of bar code pattern was conducted at the printed side of the aluminum plate at 40° C. by the use of a CCD camera sensitive to infrared rays. As a result, the bar code pattern could be identified clearly. Moreover, the adhesion between the ink (3) film and the aluminum plate was good, and the visual distinction of the printed bar code pattern was impossible.

EXAMPLE 7

There were mixed 400 parts of ITO (a product of Fuji Titanium Industry Co., Ltd., particle diameter=0.03 μm), 80 parts of a polyester resin [Vylon (trade name) produced by Toyobo Co., Ltd.], 180 parts of toluene, 170 parts of methyl ethyl ketone and 170 parts of ethyl acetate. The mixture was dispersed by the use of a paint conditioner to obtain a marking ink (5).

The ink (5) was coated on an aluminum plate (thickness= 0.3 mm) by the use of a gravure coater to form a bar code pattern i n a cured film thickness of 3 μm, followed by drying at 100° C.

Separately, there were mixed 100 parts of the same polyester resin, 80 parts of titanium dioxide, 150 parts of toluene, 150 parts of methyl ethyl ketone and 130 parts of ethyl acetate. The mixture was dispersed by the use of a paint conditioner to obtain a white ink. This white ink was coated on at least the bar code pattern area obtained above, in a film thickness of 3 μm, followed by drying at 100° C.

Identification of bar code pattern was conducted at the printed side of the printed aluminum plate at 26° C. by the use of a CCD camera sensitive to infrared rays of 3–5 μm wavelength. The infrared emissivity of the marking ink-printed area was different from that of other area, which gave good identification of bar code. For a bar code pattern formed with a marking ink containing the same components as above but containing no ITO, its identification by the use of the same CCD camera was difficult.

EXAMPLE 8

The marking ink (1) obtained in Example 1 was coated on an aluminum plate (thickness=0.23 mm) laminated with a PET film, by the use of a gravure coater to form a bar code pattern in a film thickness of 2 μm, followed by drying at 100° C.

Separately, there were mixed 100 parts of the same polyester resin as used in Example 7, 100 parts of zinc oxide, 160 parts of toluene, 150 parts of methyl ethyl ketone and 140 parts of ethyl acetate. The mixture was dispersed by the use of a paint conditioner to obtain a white ink.

This white ink was coated on at the bar code pattern-printed side of the aluminum plate in a film thickness of 3 μm, followed by drying at 100° C.

Identification of bar code pattern was conducted at the printed side of the printed aluminum plate at 45° C. by the use of a CCD camera sensitive to infrared rays of 3–5 μm wavelength. The infrared emissivity of the marking ink-printed area was different from that of other area, which gave good identification of bar code.

EXAMPLE 9

There were mixed 300 parts of ITO, 40 parts of alumina (a fine alumina powder produced by Nippon Aerosil Co., Ltd.), 140 parts of a polyester resin (a solution having a solid content of 50%), 200 parts of butyl acetate and 150 parts of toluene. The mixture was dispersed by the use of a paint conditioner to obtain a marking ink (6).

The ink (6) was coated on a tinplate sheet (thickness=0.3 mm) to form a bar code pattern in a film thickness of 4 μm and dried at 80° C. On at least the bar code-printed area was coated a white ink (Ales Aqua Gloss White produced by Kansai paint Co., Ltd., an aqueous top coating) in a film thickness of 5 μm by the use of a wire coater, followed by drying at 90° C.

Identification of printed information was conducted at the printed side of the tinplate sheet at 27° C. by the use of a CCD camera sensitive to infrared rays of 3–5 μm wavelength. The marking ink-printed area showed infrared absorption, which gave good identification of bar code.

EXAMPLE 10

There were mixed 300 parts of ITO, 40 parts of barium sulfate, 250 parts of an acrylic resin emulsion (solid content=40%) and 300 parts of tap water, and the mixture was dispersed by the use of a sand mill to obtain a marking ink (7).

The ink (7) was coated on an aluminum-PET laminated film to form a numeral in a thickness of 5 μm and dried at 100° C. for 8 seconds. Thereon was coated a gray ink by the use of a gravure coater in a film thickness of 4 μm, followed by drying at 90° C. The gray ink was obtained by mixing 500 parts of an acrylic resin emulsion (solid content=35%), 180 parts of titanium dioxide, 0.5 part of carbon black and 100 parts of water and dispersing the mixture by the use of a paint conditioner.

Identification of numeral was conducted for the resulting laminate at 22° C. by the use of a CCD camera sensitive to infrared rays. The identification was good.

EXAMPLE 11

There were mixed 600 parts of ITO, 140 parts of silicon dioxide, 350 parts of a polysiloxane resin (solid content= 40%), 200 parts of isopropyl alcohol and 300 parts of isobutyl acetate. The mixture was dispersed by the use of a sand mill to obtain a marking ink (8).

Separately, there were mixed 400 parts of a polysiloxane resin (solid content=40%), 50 parts of i ron oxide and 40 parts of zinc oxide, and the mixture was dispersed to obtain a light yellow ink.

The ink (8) was coated on an aluminum plate (thickness= 0.3 mm) to form a numeral in a film thickness of 2 μm and dried at 100° C. for 8 seconds. Thereon was coated the light brown ink in a film thickness of 4 μm by the use of a roll coater, followed by drying at 90° C.

Identification of numeral was conducted at the printed side of the aluminum plate at 18° C. by the use of a CCD camera sensitive to infrared rays of 3–5 μm wavelength. The infrared emissivity of the marking ink-printed area was different from that of other area, which gave good identification of numeral.

EXAMPLE 12

There were mixed 300 parts of ITO, 400 parts of calcium carbonate, 300 parts of a polyester resin (solid content= 50%), 200 parts of toluene and 200 parts of ethyl acetate. The mixture was dispersed by the use of a paint conditioner to obtain a marking ink (9).

The ink (9) was coated on a tin-free steel plate (thickness= 0.5 mm) to form a marking in a film thickness of 5 μm and dried at 80° C. Thereon was coated the white ink of Example 7 in a film thickness of 6 μm by the use of a gravure coater, followed by drying at 110° C.

There were dispersed, by the use of a paint conditioner, 200 parts of a polyester resin solution (solid content=40%), 10 parts of Phthalocyanine Blue, 150 parts of toluene and 100 parts of methyl ethyl ketone to obtain a blue ink.

The blue ink was coated on the marking-printed tin-free steel plate in a thickness of 4 μm and dried at 100° C.

Identification of marking was conducted at the printed side of the printed tin-free steel plate at 23° C. by the use of a CCD camera sensitive to infrared rays of 3–5 μm wavelength. The infrared emissivity of the marking ink-printed area was different from that of other area, which gave good identification of marking.

EXAMPLE 13

A white ink (a) was coated on a PET film (thickness=12.5 μm) in a film thickness of 4 μm and dried. Thereon was coated the marking ink (7) by the use of a gravure coater to form a bar code pattern in a film thickness of 3 μm, followed by drying. On the coated side of the PET film was coated an adhesive of electron beam-setting type, and the resulting PET film was laminated with an aluminum plate. The laminate was irradiated with an electron beam of 4 Mrad for curing.

Identification of bar code pattern was conducted at the PET film side of the laminate at 40° C. by the use of a CCD camera sensitive to infrared rays of 3–5 μm wavelength. The infrared emissivity of the marking ink-printed area was different from that of other area, which gave good identification of bar code.

EXAMPLE 14

An organic solvent type white coating was coated on an aluminum-metallized paper in a film thickness of 4 μm and dried. Thereon was coated the marking ink (6) by the use of a gravure coater to form English letters in a film thickness of 5 μm, followed by drying. Thereon was coated a red ink in a film thickness of 5 μm and dried at 100° C. The red ink was prepared by dispersing, by the use of a paint conditioner, 200 parts of a polyester resin solution (a 40% resin solution), 20 parts of a monoazo type red pigment, 150 parts of toluene and 150 parts of methyl ethyl ketone.

Identification of English letters was conducted at the coated side of the aluminum-metallized paper at 25° C. by the use of a CCD camera sensitive to infrared rays of 3–5 μm wavelength. The infrared emissivity of the marking ink-printed area was different from that of other area, which gave good identification of English letters.

EXAMPLE 15

The marking ink (6) was coated on an aluminum-metallized PET film by the use of a gravure coater to form English letters in a film thickness of 1 μm and dried. The coated side of the film was laminated with a stretched polypropylene film coated with an adhesive. Identification of English letters was conducted at the polypropylene film side of the laminate at 25° C. by the use of a CCD camera sensitive to infrared rays of 3–5 μm wavelength. The infrared emissivity of the marking ink-printed area was different from that of other area, which gave good identification of English letters.

EXAMPLE 16

The marking ink (2) was coated on a polyvinyl chloride sheet of 0.5 mm in thickness to form a numeral in a film thickness of 2 μm and dried. The coated side of the sheet was laminated with a white PET film (75 μm) coated with an adhesive. A tinplate sheet was placed at the polyvinyl chloride sheet side (the back side) of the laminate. Then, identification of numeral was conducted at the white PET film side of the laminate at 25° C. by the use of a CCD camera sensitive to infrared rays of 3–5 μm wavelength. The infrared emissivity of the marking ink-printed area was different from that of other area, which gave good identification of numeral. When no tinplate sheet was placed at the back side, identification of numeral was inferior.

EXAMPLE 17

The marking ink (1) was coated on a paper of 0.5 mm in thickness by the use of a gravure coater to form a pattern in a film thickness of 1 μm and dried. Thereon was coated the white ink of Example 9 in a film thickness of 5 μm by the use of a roll coater, followed by drying at 80° C. An aluminum plate was placed at the back side (the non-coated side) of the coated paper. Then, identification of pattern was conducted at the coated side of the coated paper at 25° C. by the use of a CCD camera sensitive to infrared rays of 3–5 μm wavelength. The infrared emissivity of the marking ink-printed area was different from that of other area, which gave good identification of pattern. When no aluminum plate was placed at the back side, identification of pattern was inferior.

EXAMPLE 18

There were mixed 400 parts of tin oxide, 50 parts of a fine alumina powder, 140 parts of a polyester resin (a solution having a solid content of 50%), 200 parts of butyl acetate and 150 parts of toluene. The mixture was dispersed by the use of a paint conditioner to obtain a marking ink (10).

The ink (10) was coated on an aluminum plate (thickness=0.3 mm) by the use of a gravure coater to form a bar code pattern in a film thickness of 2 μm, and dried at 100 ° C.

On at least the bar code pattern was coated the aqueous white ink of Example 9 in a film thickness of 5 μm, followed by drying at 150° C. for 60 seconds.

Identification of bar code was conducted at the coated side of the aluminum plate at room temperature (25° C.) by the use of an infrared detector shown in FIG. 4. Identification of bar code was good.

EXAMPLE 19

There were mixed 300 parts of tin oxide, 300 parts of an acrylic resin emulsion (solid content=40%) and 500 parts of tap water. The mixture was dispersed by the use of a sand mill to obtain a marking ink (11).

The ink (11) was coated on the aluminum side of an aluminum-metallized paper (thickness=0.3 mm) to form a bar code pattern in a film thickness of 5 µm, and dried at 100° C. Thereon was coated the aqueous white ink of Example 9 in a film thickness of 6 µm by the use of a gravure coater, followed by drying.

The adhesion between the ink (11) and the aluminum-metallized paper was good, and visual distinction between the ink-printed area and other area was difficult. Observation was made at the coated side of the aluminum-metallized paper at 20° C. by the use of a reader using a CCD camera sensitive to infrared rays, shown in FIG. 2, which gave good identification of bar code pattern.

What is claimed is:

1. A method for reading of information, which comprises printing information on a metal substrate or a substrate capable of transmitting infrared rays of 2–10 µm wavelength, with a marking ink containing a marking component selected from the group consisting of (1) tin oxide, (2) indium-tin mixed oxide, (3) a mixture of tin oxide and at least one compound selected from the group consisting of alumina, barium sulfate, silicon dioxide and calcium carbonate, and (4) a mixture of indium-tin mixed oxide and at least one compound selected from the group consisting of alumina, barium sulfate, silicon dioxide and calcium carbonate said marking component being infrared absorbable; as necessary coating a clear coating or a coloring ink on at least the information-printed area of the substrate; when the substrate is not the metal substrate, then placing a metal sheet at a side opposite to the information-printed side of the substrate; and identifying the information by detecting, from the information-printed side of the substrate, infrared rays emitted from the information-printed area of the substrate by means of a CCD camera sensitive to infrared rays of 2–10 µm wavelength or an infrared detector.

2. The method set forth in claim 1, wherein the tin oxide is SnO or $SnO_2$.

3. The method set forth in claim 1, wherein the indium-tin mixed oxide consists of 1–95% by weight of indium oxide and 95–5% by weight of tin oxide.

4. The method set forth in claim 1, wherein the indium-tin mixed oxide consists of 40–90% by weight of indium oxide and 60–10% by weight of tin oxide.

5. The method set forth in claim 1, wherein the mixture contains (3) or (4) contains at least one compound selected from the group consisting of alumina, barium sulfate, silicon dioxide and calcium carbonate, in an amount of 5–400 parts by weight per 100 parts of tin oxide or indium-tin mixed oxide.

6. The method set forth in claim 1, wherein the mixture (3) or (4) contains at least one compound selected from the group consisting of alumina, barium sulfate, silicon dioxide and calcium carbonate, in an amount of 20–200 parts by weight per 100 parts of tin oxide or indium-tin mixed oxide.

7. The method set forth in claim 1, wherein the marking ink further contains a coating resin.

8. The method set forth in claim 7, wherein the marking ink contains the marking component in an amount of 10–1,000 parts by weight, per 100 parts by weight (as solid content) of the coating resin.

9. The method set forth in claim 8, wherein the amount of the marking component is 100–500 parts by weight per 100 parts by weight (as solid content) of the coating resin.

10. The method set forth in claim 1, wherein the metal substrate is made of aluminum, tinplate, iron, stainless steel, copper, an alloy containing said metal(s), paper or plastic metallized with said metal or a laminate of said metal and a plastic film.

11. The method set forth in claim 1, wherein the substrate capable of transmitting infrared rays of 2–10 µm wavelength is a plastic, a paper, a wood or a cloth.

12. The method set forth in claim 1, wherein the information is printed on the substrate with the marking ink by gravure printing, silk screen printing, offset printing or ink jet method.

13. The method set forth in claim 1, wherein the information is printed on the substrate with the marking ink in a dry film thickness of 0.5–10 µm.

14. The method set forth in claim 1, wherein the information is letter(s), numeral(s), marking(s) or a pattern.

15. An article having information printed by the method of claim 1.

* * * * *